PAUL P. REICHERTZ
CHARLES E. FRANCIS
INVENTORS

BY Frederick E. Dumoulin
ATTORNEY

April 5, 1955  P. P. REICHERTZ ET AL  2,705,418
APPARATUS FOR MEASURING CHARACTERISTICS OF
CORE SAMPLES UNDER COMPRESSIVE STRESSES
Filed Dec. 30, 1950  3 Sheets-Sheet 2

PAUL P. REICHERTZ
CHARLES E. FRANCIS
INVENTORS

BY Frederick E. Dumoulin
ATTORNEY

April 5, 1955 P. P. REICHERTZ ET AL 2,705,418
APPARATUS FOR MEASURING CHARACTERISTICS OF
CORE SAMPLES UNDER COMPRESSIVE STRESSES
Filed Dec. 30, 1950 3 Sheets-Sheet 3

PAUL P. REICHERTZ
CHARLES E. FRANCIS
INVENTORS

BY Frederick E. Dumoulin
ATTORNEY

United States Patent Office 2,705,418
Patented Apr. 5, 1955

2,705,418

APPARATUS FOR MEASURING CHARACTERISTICS OF CORE SAMPLES UNDER COMPRESSIVE STRESSES

Paul P. Reichertz and Charles E. Francis, Dallas, Tex., assignors, by mesne assignments, to Socony-Vacuum Oil Company, Incorporated, New York, N. Y., a corporation of New York Application December 30, 1950, Serial No. 203,740

16 Claims. (Cl. 73—38)

This invention relates to the measurement of characteristics of porous materials and relates more particularly to apparatus for measurement of the characteristics under compressive stresses of core samples obtained from subterranean formations. The present application is a continuation-in-part of application Serial No. 113,161, filed August 30, 1949, now abandoned.

In making predictions concerning extent of primary recovery, effect of secondary recovery operations, pressure maintenance, and other matters with respect to the performance of a subterranean petroleum oil or gas reservoir, it is necessary to know various characteristics or properties of the formation or formations such as permeability, interstitial water content, porosity, etc. Knowledge of the characteristics of a formation may be obtained by drilling a core therefrom and subjecting the core or a sample thereof to various test procedures to obtain the desired information. Commonly, the characteristics of core samples have been measured under such conditions that the samples have been substantially free of compressive stresses, with the exception of minor compressive stresses which may be imposed on the end faces of the sample by the sample holder for the purpose of supporting the sample or imposed along the length of the sample to prevent leakage of fluid between the walls of the sample and the holder. The subterranean formation, however, is subject to compressive stresses due to the weight of the overburden, and it can be demonstrated that the characteristics of a core sample are affected markedly by compressive stresses imposed thereon. Accordingly, the values of the characteristics of a core sample obtained by the commonly used methods have not been representative of the values of the characteristics of the subterranean formation, and predictions and calculations with respect to reservoir performance based upon such measured values of the characteristics of the core sample are not dependable to the extent that the measured values of the characteristics of the core sample do not accurately reflect the characteristics of the subterranean formation subject to compressive stresses imposed by the overburden.

It is an object of this invention to provide an apparatus for determining characteristics of porous materials such as core samples subject to compressive stresses. It is another object of this invention to obtain measured values of characteristics of core samples more truly representative of the characteristics of the formation from which the core samples were obtained. It is another object of this invention to improve calculations of petroleum oil or gas reservoir performance. Further objects of the invention will become apparent from the following description thereof.

In accordance with the invention, we provide an apparatus for imposing over the surface area of a core sample obtained from a subterranean formation a compressive stress approximating the compressive stress on the formation from which the sample was obtained whereby characteristics of the core sample may be measured while subject to such compressive stress.

A petroleum oil or gas producing formation is subjected to the weight of the overburden, namely, the weight of the solid earth material and, depending upon the lithologic character of the overburden, the weight of the liquid material above the formation. The pressure on the formation due to the weight of the solid earth material and the liquid material is the geostatic pressure. The formation will also have a formation fluid pressure, however, which is the pressure of the fluid within the formation. The compressive stress on the formation, accordingly, will be the difference between the geostatic pressure and the formation fluid pressure. The geostatic pressure varies as the composition of the overburden varies, for example, the geostatic pressure of an overburden of rock will be greater than the geostatic pressure of an overburden of clay, and therefore, to determine the geostatic pressure, data with respect to the depth and specific gravity of each strata of the overburden is required. Further, because of keystoning or bridging, a lesser geostatic pressure may be imposed upon the formation than would normally result from the weight of the overburden. At shallow depths, the geostatic pressure can be determined with reasonable accuracy but as the depth increases it becomes more difficult to determine the geostatic pressure because of increase in the number of strata in the overburden and the greater chance of the presence of keystoning or bridging. We have discovered, however, that the effect of increments of compressive stress on the characteristics of the formation decreases with increasing stress and, accordingly, assuming comparable formation fluid pressures, uncertainties with respect to the geostatic pressure due to the greater depths will have only slight effect on the characteristics of the core sample. On the other hand, at shallow depths, assuming comparable formation fluid pressures, where uncertainties with respect to the geostatic pressure have a greater effect on the characteristics of the core sample, the geostatic pressure can be determined with greater accuracy.

In employing our apparatus, we prefer to subject the surface area of a core sample during measurement of its characteristics to a compressive stress which is equivalent, as closely as can be determined, to the compressive stress imposed upon the formation by the weight of the overburden, i. e., the difference between the geostatic pressure and the formation fluid pressure. The compressive stress on the formation may be determined with sufficient accuracy by calculation, taking the geostatic pressure as being one pound per square inch per foot of depth of the formation below the surface of the ground, but preferably is determined from measurements of the thickness and specific gravity of each strata between the formation and the surface of the ground. The formation fluid pressure may be measured simply by any type of hydrostatic pressure measuring instrument.

Employing the apparatus of the invention, various characteristics of a core sample may be measured. Included among these characteristics is permeability, i. e., the ability of the formation comprising the reservoir from which the core was taken to transmit fluids. Permeability of a core sample is determined by forcing a fluid, the permeability to which the core sample is being tested, through the core sample, the core sample having previously been saturated with the same fluid, and measuring the rate of flow of fluid through the core sample. The permeability is expressed in terms of the viscosity of the fluid, the pressure drop of the fluid passing through the core sample, and the length and cross sectional area of the core sample. Accordingly, since the length and cross sectional area of the core sample must be known, a core sample having parallel plane faces is used, and the core sample may be rectangular, cylindrical or otherwise shaped and has a known length.

Another characteristic of a core sample which may be measured employing the apparatus of the invention is effective porosity. Porosity is usually expressed as the ratio of the volume of the open spaces or pores within the core sample, or pore volume, to the total volume of the core sample and is ordinarily measured by saturating the core sample with a fluid at a known pressure, such as air at atmospheric pressure, reducing the pressure on the core sample, and determining the volume of fluid removed from the core sample as a result of the reduction in pressure. Knowing the original bulk volume of the core sample, and correcting the volume of fluid removed by the reduction in pressure to the volume occupied at the pressure at which the core sample was saturated, the porosity may be determined.

Interstitial water content is another characteristic of core samples which may be measured employing the apparatus of the invention. Interstitial water content may be defined as the amount of water in a formation which can be held by capillary forces. The interstitial water content can be measured indirectly by saturating the core sample with water or an aqueous solution such as brine, placing the core sample in capillary contact with a semipermeable membrane and subjecting it to a pressure of a fluid immiscible with the liquid employed for saturating the core sample. The water or aqueous solution is expelled from the core sample through the semi-permeable membrane as a result of capillary forces created by the externally applied fluid pressure and the water content of the core sample at equilibrium under the pressure condition imposed is the interstitial water content at that particular pressure.

For determining characteristics of core samples employing our apparatus, the surface area of the core sample is subjected to a compressive stress approximating the compressive stress on the formation from which the core sample was obtained, and this compressive stress is imposed not only on the side walls but also on the end faces of the core sample.

Figure 1:
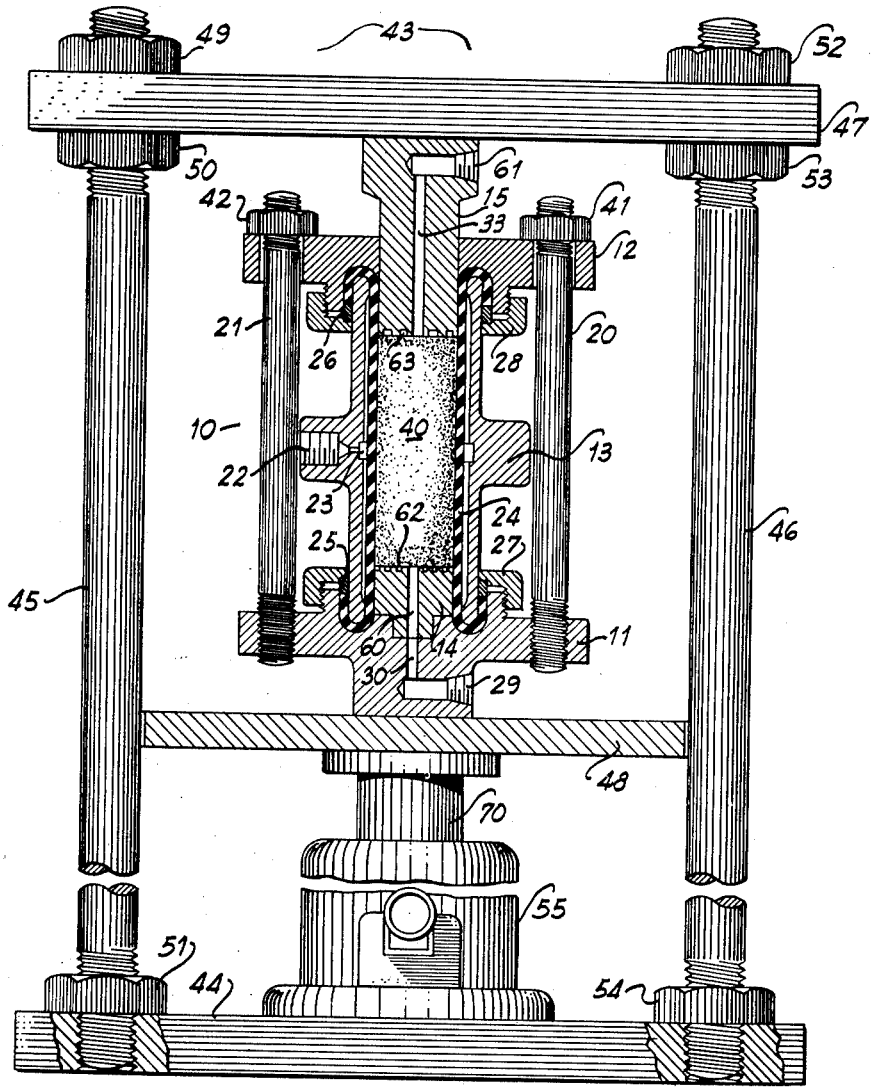
Figure 1 is an elevation partly in section of one embodiment of apparatus constructed in accordance with our invention.

Referring now to Figure 1, the numeral 10 indicates generally a core sample cell. The core sample cell has a lower base member 11, an upper base, or chamber receiving, member 12, a core sample receiving chamber member 13, a base closure 14, a piston 15, and a plurality of bolts, of which bolts 20 and 21 are shown. If desired, base member 11 and closure 14 may be made integral with each other. Further, if desired there may be substituted for base member 11 and base closure 14, a base member similar to upper base member 12 and a piston similar to piston 15, in which case either piston can be regarded as a closure for chamber member 13. Chamber member 13 is provided with a port or conduit 22 leading to channel 23 extending along the length of the inner walls of the chamber, and a sleeve 24, composed of a flexible, impervious material, such as rubber, is positioned within the chamber and extended over the upper and lower ends of the chamber. Chamber member 13, as well as closure 14 and piston 15, may be cylindrical or rectangular or otherwise shaped to accommodate respectively shaped core samples. To prevent leakage of fluid from channel 23 along the edges of the sleeve and to prevent extrusion of the sleeve, seal rings 25 and 26 are provided, and to compress the seal rings against the sleeve, threaded retainer rings 27 and 28, respectively, are provided. The lower base member 11 is provided with a port 29 leading to conduit 30. Piston 15 is provided with a conduit 33. A core sample 40, a characteristic of which is to be measured, is positioned within chamber member 13 between closure 14 and piston 15.

Upon assembly of the core sample cell 10, closure 14 is seated upon lower base member 11 and chamber member 13, with sleeve 24, seal ring 25, and retainer ring 27, is slipped over closure 14. Core sample 40 is positioned within the chamber member, the retainer ring 28 and the seal ring 26 are slipped over the chamber member, and the upper base member 12 is fitted over and is received by the chamber member, sleeve 24 being interposed between the chamber member and the upper base member. Bolts 20 and 21 are then tightened by means of nuts 41 and 42, respectively, and seal rings 25 and 26 are tightened against the sleeve by retainer rings 27 and 28, respectively. Piston 15 is then placed within the chamber member 13 against the core sample 40, and, in this connection, piston 15 may be regarded as an upper closure for the chamber member 13.

The desired compressive stress may be imposed upon the end faces of the core sample by forcing the piston 15 against the core sample, and imposed upon the side walls of the core sample by imposing a fluid pressure through conduit 22 to channel 23 against sleeve 24. Imposition of the fluid pressure against sleeve 24 serves the additional purpose of preventing leakage of fluid against the side walls of the core sample. To force the piston 15 against the core sample, press 43 is employed. The press comprises a base 44, two threaded supporting rods 45 and 46, platform 47 affixed to the rods, platform 48 slidably movable on the rods, and nuts 49, 50, 51, 52, 53 and 54. The core sample cell is placed between the platforms 48 and 47, and by means of a hydraulic jack 55, the platform 48 may be moved upwardly whereby piston 15, being movable within the chamber member 13 and upper base member 12, compresses the core sample against closure 14.

The particular embodiment of the apparatus illustrated in Figure 1 may be employed in measurement of the permeability of the core sample. In measuring permeability, as mentioned before, a fluid is forced through the core sample, and, for this purpose, closure 14 is provided with conduit 60 which connects with conduit 30 in lower base member 11, piston 15 is provided with port 61 leading to conduit 33, and closure 14 and piston 15 are provided respectively with grooves 62 and 63 which may extend radially and circumferentially over the faces of the pistons and which connect with conduits 60 and 33, respectively, the grooves serving to distribute or gather fluid from or to the conduits 60 and 33 over the faces of the pistons.

In measuring the permeability of a core sample under compressive stress, the core sample, of suitable known length and cross sectional area, and either rectangular or cylindrical in shape and having two parallel plane end faces, is treated to remove oil or other liquid material contained therein. This may be accomplished by extracting the core sample with a suitable solvent such as acetone, benzene, toluene, etc., and the extraction may be carried out in a Soxhlet extractor or other suitable type of apparatus. Following extraction, the core sample is thoroughly dried of all solvent, as, for example, by heating in a drying oven at about 100° C. The core sample is then saturated with the fluid to which the permeability is to be measured and is positioned in the sample cell 10, as hereinbefore described. Thereafter, the cell is placed between th platforms 48 and 47 of the press 43.

Figure 4:
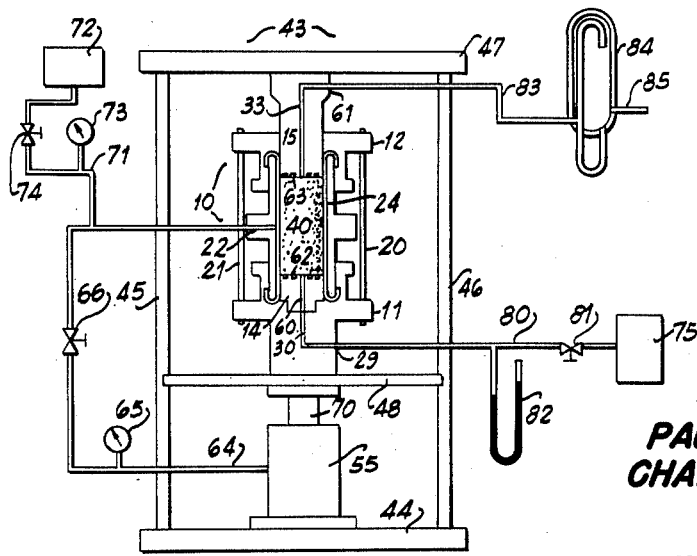
Figure 4 is a diagrammatic representation illustrating a method of measuring permeability of a core sample employing an embodiment of apparatus of the invention.

From the depth of the formation from which the core sample was taken, or the thickness and specific gravity of the strata between the formation and the surface of the ground, and the formation fluid pressure, the compressive stress on the formation is calculated. The desired compressive stress is imposed upon the end faces of the core sample by operation of hydraulic jack 55. Referring to Figure 4, a line 64 containing pressure gage 65 and valve 66 is connected between the hydraulic jack 55 and conduit 22 in chamber member 13 whereby the fluid pressure in the jack imposing the compressive stress on the end faces of the core sample 40 also imposes a compressive stress on the side walls of the core sample by imposing fluid pressure between the side wall of the chamber and the sleeve and forcing the sleeve against the core sample. The pressure indicated on gage 65 will be equal to the compressive stress imposed upon the side walls of the core sample, and, where the cross sectional area of the core sample is equal to the cross sectional area of the piston 70 of jack 55 exposed to the pressure of the fluid in the jack, equal to the compressive stress imposed upon the end faces of the core sample. However, where the areas of the piston 70 exposed to the pressure of the fluid in the jack and the core sample 40 are not equal, the compressive stress on the end faces of the core sample will be the product of the fluid pressure within the jack, as indicated on gage 65, and the ratio of the cross sectional area of the core sample to the cross sectional area of the piston. In the case illustrated, valve 66 is closed, and the desired compressive stress, as determined from the reading on gage 65, is imposed by means of the jack on the end faces of the core sample. Line 71 is connected between line 64 and fluid pressure tank 72 and contains pressure gage 73 and valve 74, the valve being closed when valve 66 is open, and the desired compressive stress may be imposed on the side walls of the core sample by opening valve 74, the pressure indicated on the gage 73 being equal to the compressive stress on the side walls of the core sample.

The desired compressive stress being imposed upon the end faces and side walls of the core sample, measurement of permeability of the core sample is then made. The permeability of the core sample may be measured to any fluid, such as air, nitrogen, natural gas, water, petroleum oil, etc. The fluid to which the permeability of the core sample is to be measured is passed under pressure from reservoir 75 through line 80 containing valve 81 and manometer 82 to port 29 in lower base member 11. The fluid passes through conduit 30 and conduit 60 to grooves 62 where it is distributed over the face of the piston and consequently, over the face of the core sample. The fluid then passes through core sample 40. The fluid leaves the core sample, is gathered by grooves 63, and then passes through conduit 33, port 61, to line 83 connected to port 61. Line 83 contains flow rate measuring instrument 84, which may be a capillary flow-meter where the fluid passed through the core sample is a gas, and fluid leaves the instrument through line 85. From the pressure gradient of the fluid passing through the core sample, the rate of flow of the fluid, the cross sectional area and length of the core sample, and the known viscosity of the fluid, the permeability of the core sample is calculated using customary formulas. It will be understood, of course, that the permeability of the core sample may also be measured by passing the fluid downwardly therethrough as well as upwardly.

Figure 2:
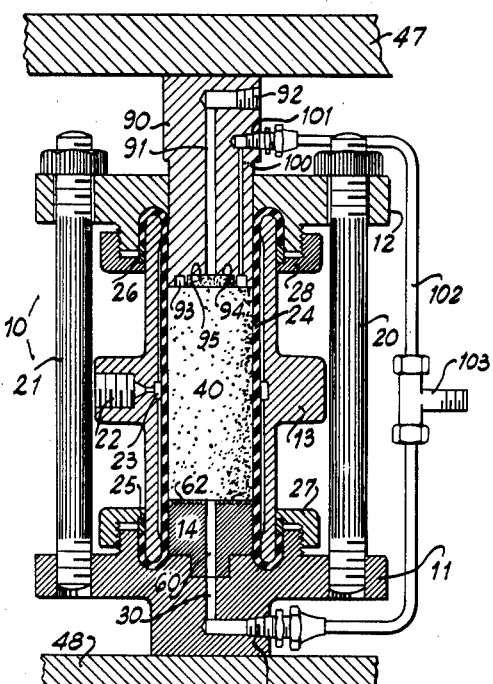
Figure 2 is an elevation partly in section, with certain parts illustrated in Figure 1 cut away, of another embodiment of apparatus constructed in accordance with our invention.

For measurement of the interstitial water content of core samples, the piston or closure 15 of the apparatus described above is modified somewhat. Referring to Figure 2, the piston 90 contains a conduit 91 and a port 92 similar to the piston 15 of Figures 1 and 4. However, the piston 90, in place of grooves 63, contains a channel 93 and a seat 94 for a semi-permeable membrane 95. Conduit 100 leads to channel 93 at one end and to port 101 at the other end. A pipe 102 containing a T-joint 103 connects conduits 100 and 30.

In carrying out the interstitial water content measurement of the core sample, the core sample is first cleaned and dried, as described above, and weighed. The core sample is then saturated with water or with a desired aqueous solution and again weighed. The semi-permeable membrane 95 is saturated with the same liquid employed for saturating the core sample. The core sample is positioned within the core sample receiving chamber member 13, the semi-permeable membrane is positioned within the seat 94, being sealed tightly therein to prevent leakage of fluid along the walls of the seat, and the core sample cell 10 is assembled and placed within the press 43 as described above and as shown in Figure 2.

Figure 6:
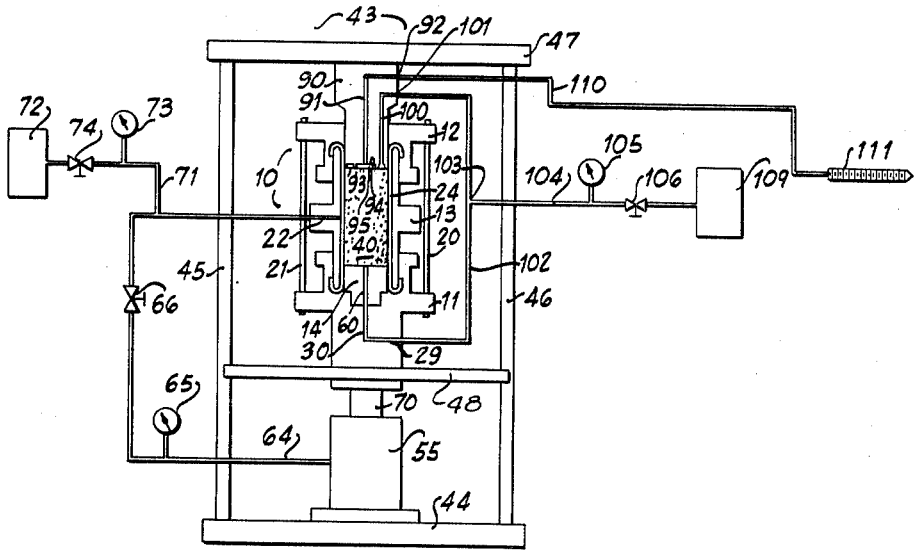
Figure 6 is a diagrammatic representation illustrating a method of measuring interstitial water content of a core sample employing an embodiment of apparatus of the invention.

Referring to Figure 6, line 102 is connected at T-joint 103 to line 104 containing pressure gage 105 and valve 106 and leading to pressure tank 109. Line 110 is connected to liquid volume measuring means such as pipette 111 and filled to the zero mark on pipette 111 with the same liquid used to saturate the core sample and the semi-permeable membrane. The desired compressive stress is imposed on the core sample 40 as described above in connection with Figures 1 and 4. Some of the water or aqueous solution employed for saturating the core sample 40 will be removed from the core sample as a result of the imposed compressive stress. To insure that this water or aqueous solution will pass through conduit 91 and line 110 and be measured by pipette 111, and will not pass through conduits 60 or 100, valve 106 is kept closed and the compressive stress is built up slowly on the core sample. Alternatively, the amount of water or aqueous solution removed from the core sample may be determined by imposing the compressive stress on the core sample, releasing the stress, removing the core sample from the cell, and weighing. Thereafter, the core sample may be returned to the cell and the compressive stress reimposed, conduits 60 and 100 and the connecting lines being cleaned of any fluid removed from the core sample. If desired, the amount of fluid removed from the core sample as a result of the compressive stress may be calculated from an independent determination, as hereinafter described, of any decrease in porosity as a result of imposition of compressive stress. For creating the capillary pressure forces within the core sample, any fluid immiscible with the liquid employed for saturating the core sample and semi-permeable membrane may be employed. Suitable fluids include liquids such as kerosene or gases such as air or nitrogen. The fluid for creating the capillary pressure forces is maintained under pressure in tank 109 and the desired pressure of this fluid is imposed upon the core sample by opening valve 106 to the necessary extent, the fluid pressure on the core sample being indicated by gage 105. The amount of water expelled from the core sample as a result of the capillary pressure forces after equilibrium is attained is measured by pipette 111. Determining the original amount of water or aqueous solution in the saturated core sample by subtracting the weight of the dry core sample from the weight of the saturated core sample, the interstitial water content at the imposed fluid pressure will be the difference between this amount and the amount removed by the effect of compressive stress and imposed fluid pressure.

Figure 3:
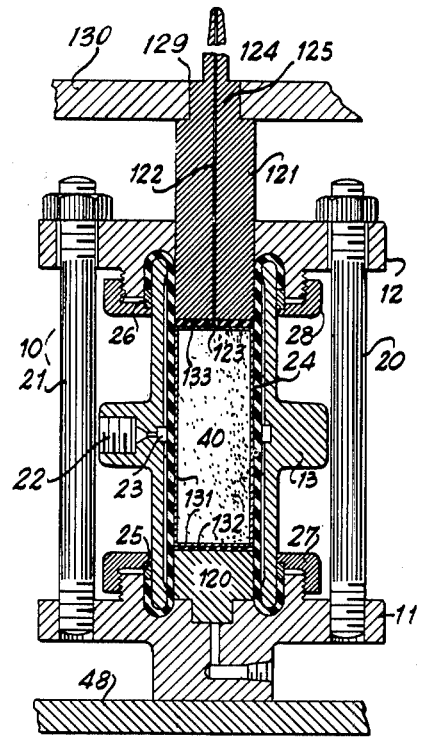
Figure 3 is an elevation, partly in section, with certain parts illustrated in Figure 1 cut away, of another embodiment of apparatus constructed in accordance with our invention.

Referring to Figure 3, for measurement of the porosity of a core sample under compressive stress, the two closures of the chamber member 13 are modified. The lower closure 120 does not contain a conduit and upper closure or piston 121 contains a narrow conduit 122 which leads between nipple 123 and nipple 124 on the lower and upper faces, respectively, of the piston. The conduit 122 is preferably made narrow to reduce its volume so that only a small proportion of the volume of fluid removed from the core sample during porosity measurement will occupy the conduit and measurement of the volume of fluid removed from the core sample will be more sensitive. The upper portion of the piston 121 is provided with a head 125 receivable within a port 129 in platform 130. Prior to assembly of the cell and subsequent to cleaning and drying the core sample, it is preferred to cover the core sample 40 with a wrapping 131 of lead foil or other pliable, substantially non-elastic material and seal the material to the core sample by the application of pressure in order to reduce to a negligible value the void volume resulting from uneven surfaces of the core sample. Following sealing, a small hole is made in the wrapping at the point where the core sample will contact the nipple 123. The core sample cell is assembled similarly as described in connection with Figures 1 and 2 except that gasket 132 and annular gasket 133 are placed within the chamber member 13 at the ends of the core sample 40.

Figure 5:
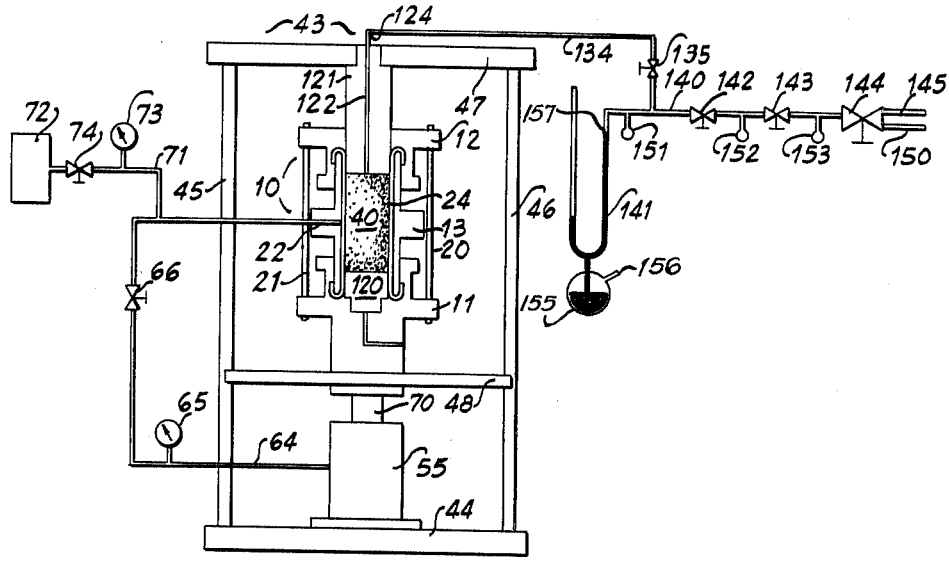
Figure 5 is a diagrammatic representation illustrating a method of measuring porosity of a core sample employing an embodiment of apparatus of the invention.

Referring to Figure 5, line 134 containing valve 135 is connected to nipple 124. Line 134 leads to line 140 provided at one end with a mercury manometer 141 or other pressure measuring instrument and at the other end with valves 142, 143, and 144. Line 145 connected to valve 144 leads to a suitable type of vacuum pump and line 150 is open to the atmosphere. While the lines, valves, and other equipment leading from the core sample preferably have the smallest possible volume to be occupied by fluid in order to obtain sensitivity of measurement, provision, however, must be made for space to be occupied by the fluid from the core sample when large amounts of fluid are removed from the core sample. Accordingly, line 140 is also provided with chambers 151, 152, and 153 to be occupied by fluid removed from the core sample.

Assuming air to be the fluid for saturating the core sample and the pressure of the air to be atmospheric, after the cleaned, dried, and wrapped core sample has been placed in the chamber member 13 and the cell 10 assembled and placed within the press 43, valves 135, 142, and 143 are opened, and valve 144 is opened to line 150 so that the core sample is at atmospheric pressure. The desired compressive stress is then imposed upon the core sample. Valve 135 is closed, valve 144 is opened to line 145, and the pressure within the line 140 is reduced to the desired value as measured by manometer 141. Manometer 141 is provided with a mercury reservoir 155 having spout 156 and pressure is imposed within the reservoir through the spout to bring the mercury level in the low pressure leg to the zero calibration mark 157. Then either of valves 142, 143, or 144 is closed depending upon the volume of air expected to be removed from the core sample and the difference in heights of the mercury columns in manometer 141 is measured. Valve 135 is now opened and the air within the core sample and the conduits up to valve 135 allowed to expand into chamber 151, chamber 151 plus chamber 152, or chamber 151 plus chamber 152 plus chamber 153, depending upon whether valve 142, 143, or 144 was closed. The mercury level in the low pressure leg of manometer 141 is readjusted to the zero calibration mark and the difference in the heights of the mercury columns is measured. The pore volume of the core sample will be given by the expression $$V_p = V\frac{\Delta h_1}{\Delta h_2} - V - V_t$$

where V is the volume of the conduits and chambers between the calibration mark 157, valve 135, and valve 142, 143, or 144 depending upon which of these three valves is opened, $\Delta h_1$ and $\Delta h_2$ are the differences in the heights of the mercury columns before and after, respectively, valve 135 is opened, and $V_t$ is the volume of conduit 122 and line 134 up to valve 135. The porosity will be the ratio of this pore volume to the volume of the core sample as measured prior to the time the wrapping 131 is applied.

Having thus described our invention, it will be understood that such description has been given by way of illustration and example and not by way of limitation, reference for the latter purpose being had to the appended claims.

We claim:

1. Apparatus of the character described comprising means providing a chamber adapted to hold a sample of porous material and having a conduit leading to the side wall thereof, said chamber being open at two opposite ends, a flexible sleeve within said chamber and extending over the ends of said chamber, a base member closing one end of said chamber and receiving the portion of said sleeve extending thereover, a chamber receiving member receiving the other end of said chamber and the portion of said sleeve extending thereover, means for holding said base member and said chamber receiving member in tight contact with said chamber, and a piston passing through said chamber receiving member and entering said chamber, said piston fitting within said sleeve and having a conduit therein leading exteriorly thereof to the face thereof within said chamber.

2. Apparatus of the character described comprising means providing a chamber adapted to receive a sample of porous material, a closure at one end of said chamber, a flexible sleeve within said chamber, means for imposing a measurable fluid pressure between the side wall of said chamber and said sleeve, a piston within said chamber at the other end thereof, means for imposing a measurable pressure on and forcing said piston within said chamber, means providing a conduit in said piston leading exteriorly thereof to the face thereof within said chamber, and fluid flow measuring means connected to said last named means.

3. Apparatus for measuring characteristics of a porous material while subject to a compressive stress thereon comprising means providing a chamber adapted to hold a sample of porous material and having a conduit leading to the inner wall thereof, a closure member at one end of said chamber, a flexible sleeve within said chamber, means connected with said conduit for imposing a measurable fluid pressure between the side wall of said chamber and said sleeve, a closure member comprising a piston entering said chamber at the other end thereof and fitting within said sleeve, means for imposing a measurable pressure on and forcing said piston within said chamber, means providing a conduit in at least one of said closure members leading exteriorly thereof to the face thereof at said chamber, and fluid flow measuring means connected to said last named means.

4. Apparatus for measuring characteristics of a porous material while subject to a compressive stress thereon comprising means providing a chamber adapted to hold a sample of porous material and having a conduit leading to the inner wall thereof, a closure at one end of said chamber, a flexible sleeve within said chamber, means for retaining said sleeve within said chamber, means connected with said conduit for imposing a measurable fluid pressure between the side wall of said chamber and said sleeve, piston means entering the other end of said chamber and fitting within said sleeve, means for imposing a measurable pressure on and forcing said piston means within said chamber, means providing a conduit within said piston means leading exteriorly thereof to the face thereof within said chamber, and fluid flow measuring means connected to said last named means.

5. A permeability cell comprising means providing a chamber adapted to hold a sample of porous material and having a conduit leading to the inner wall thereof, said chamber having two open opposite ends, a flexible sleeve within said chamber, means for retaining said sleeve within said chamber, closures entering each open end of said chamber and fitting within said sleeve at least one of said closures comprising a piston and each of said closures containing a conduit therein leading exteriorly thereof to the face thereof within said chamber, fluid distributing means at the face of one of said closures leading to said conduit contained in said closure, and fluid gathering means at the face of said other closure leading to said conduit contained in said closure.

6. A permeability cell comprising means providing a chamber adapted to hold a sample of porous material and having a conduit leading to the inner wall thereof, said chamber having two open opposite ends, a flexible sleeve within said chamber, a base member closing one end of said chamber and fitting within said sleeve, a chamber receiving member contacting the other end of said chamber, means for holding said base member and said chamber receiving member in tight contact with said chamber, a piston passing through said chamber receiving member and entering said chamber, said piston fitting within said sleeve, means providing a conduit in said base member leading exteriorly thereof to the face thereof at said chamber, and means providing a conduit in said piston leading exteriorly thereof to the face thereof within said chamber.

7. An interstitial water cell comprising means providing a chamber adapted to hold a sample of porous material and having a conduit leading to the inner wall thereof, said chamber having two open opposite ends, a flexible sleeve within said chamber, means for retaining said sleeve within said chamber, closures entering each open end of said chamber and fitting within said sleeve, at least one of said closures comprising a piston, a semi-permeable membrane positioned at and covering a portion of the face of one of said closures, means providing a conduit leading through said last mentioned closure to said semi-permeable membrane, means providing a channel at the face of said last mentioned closure adjacent to said semi-permeable membrane, means providing a conduit leading to said channel, means providing a conduit leading to the face of said other closure, and pipe means connecting said last mentioned conduits.

8. An interstitial water cell comprising means providing a chamber adapted to hold a sample of porous material and having a conduit leading to the inner wall thereof, said chamber having two open opposite ends, a flexible sleeve within said chamber, a base member closing one end of said chamber and fitting within said sleeve, a chamber receiving member contacting the other end of said chamber, means for holding said base member and said chamber receiving member in tight contact with said chamber, a closure for the other end of said chamber comprising a piston passing through said chamber receiving member and entering said chamber, said piston fitting within said sleeve, a semi-permeable membrane positioned at and covering a portion of the face of one of said closures within said chamber, means providing a conduit leading through said last mentioned closure to said semi-permeable membrane, means providing a channel at the face of said last mentioned closure adjacent to said semi-permeable membrane, means providing a conduit leading to said channel, means providing a conduit leading to the face of said other closure within said closure, and pipe means connecting said last mentioned conduits.

9. A porosity cell comprising means providing a chamber adapted to hold a sample of porous material and having a conduit leading to the inner wall thereof, said chamber having two open opposite ends, a flexible sleeve within said chamber, closures entering each open end of said chamber and fitting within said sleeve, at least one of said closures comprising a piston entering said chamber and fitting within said sleeve, and means providing a conduit in one only of said closures leading exteriorly thereof to the face thereof within said chamber.

10. A porosity cell comprising means providing a chamber adapted to hold a sample of porous material and having a conduit leading to the inner wall thereof, said chamber having two open opposite ends, a flexible sleeve within said chamber, a solid closure member entering one open end of said chamber and fitting within said sleeve, a chamber receiving member contacting the other end of said chamber, means for holding said solid closure member and said chamber receiving member in tight contact with said chamber, a piston passing through said chamber receiving member and entering said chamber, said piston fittting within said sleeve, and means providing a conduit in said piston leading exteriorly thereof to the face thereof within said chamber.

11. Apparatus for measuring the permeability of a porous material subject to compressive stress comprising means providing a chamber adapted to hold a sample of porous material and having a conduit leading to the inner wall thereof, said chamber having two open opposite ends, a flexible sleeve within said chamber, means for retaining said sleeve within said chamber, means connected with said conduit for imposing a measurable fluid pressure between the side wall of said chamber and said sleeve, closures entering each open end of said chamber and fitting within said sleeve, at least one of said closures comprising a piston and each of said closures containing a conduit leading exteriorly thereof to the face thereof within said chamber, means for imposing a measurable pressure on and forcing said piston within said chamber, fluid distributing means at the face of one of said closures leading to said conduit contained in said closure, fluid gathering means at the face of said other closure leading to said conduit contained in said closure, and fluid flow rate measuring means connected to one of said conduits in said closures.

12. Apparatus for measuring the permeability of a porous material subject to compressive stress comprising means providing a chamber adapted to hold a sample of porous material and having a conduit leading to the inner wall thereof, said chamber having two open opposite ends, a flexible sleeve within said chamber, closures entering each open end of said chamber and fitting within said sleeve, at least one of said closures comprising a piston and each of said closures containing a conduit passing therethrough, common means for imposing a measurable pressure on and forcing said piston within said chamber and for imposing a measurable pressure between the side wall of said chamber and said sleeve, fluid distributing means at the face of one of said closures leading to said conduit contained in said closure, fluid gathering means at the face of said other closure leading to said conduit contained in said closure, and fluid flow rate measuring means connected to one of said conduits in said closures.

13. Apparatus for measuring the interstitial water content of a porous material subject to compressive stress comprising means providing a chamber adapted to hold a sample of porous material and having a conduit leading to the inner wall thereof, said chamber having two open opposite ends, a flexible sleeve within said chamber, means connected with said conduit for imposing a measurable fluid pressure between the side wall of said chamber and said sleeve, closures entering each open end of said chamber and fitting within said sleeve, at least one of said closures comprising a piston, means for imposing a measurable pressure on and forcing said piston within said chamber, a semi-permeable membrane positioned at and covering a portion of the face of one of said closures, means providing a conduit leading through said last mentioned closure to said semi-permeable membrane, means providing a channel at the face of said last mentioned closure adjacent to said semi-permeable membrane, means providing a conduit leading to said channel, means providing a conduit leading to the face of said other closure, means connected with said last mentioned conduits for imposing a measurable fluid pressure within said chamber, and fluid volume measuring means connected with said conduit leading to said semi-permeable membrane.

14. Apparatus for measuring the porosity of a porous material subject to compressive stress comprising means providing a chamber adapted to hold a sample of porous material and having a conduit leading to the inner wall thereof, said chamber having two open opposite ends, a flexible sleeve within said chamber, means for imposing a measurable fluid pressure between the side wall of said chamber and said sleeve, a solid closure entering one open end of said chamber and fittting within said sleeve, a piston entering the other open end of said chamber and fittting within said sleeve, said piston containing a conduit leading exteriorly thereof to the face thereof within said chamber, means for imposing a measurable pressure on and forcing said piston within said chamber, and fluid volume measuring means connected with said conduit passing through said piston.

15. Apparatus of the character described comprising means providing a chamber adapted to hold a sample of porous material and having a conduit leading to the side wall thereof, a flexible sleeve within said chamber, a closure member closing one end of said chamber, a chamber receiving member contacting the other end of said chamber, means for holding said base member and said chamber receiving member in tight contact with said chamber, a closure member comprising a piston passing through said chamber receiving member and entering said chamber at the other end thereof, said last mentioned closure member fitting within said sleeve, and means providing a conduit in at least one of said closure members leading exteriorly thereof to the face thereof at said chamber.

16. Apparatus of the character described comprising means providing a chamber adapted to receive a sample of porous material and having a conduit through the wall thereof, a flexible sleeve within said chamber, a first base member closing one end of said chamber and having a recess therein for receiving the end of said chamber closed by said first base member, a second base member having a recess therein for receiving the other end of said chamber and having an opening therethrough leading to said chamber, means for retaining said first and second base members at the ends of said chamber, and a piston passing through said opening in said second base member and slidably received within said chamber, said piston having a conduit therein leading exteriorly thereof to the face thereof within said chamber.

References Cited in the file of this patent

UNITED STATES PATENTS

| | | |
|---|---|---|
| 2,345,935 | Hassler | Apr. 4, 1944 |
| 2,465,948 | Welge | Mar. 29, 1949 |
| 2,498,198 | Beeson | Feb. 21, 1950 |
| 2,539,355 | Reichertz | Jan. 23, 1951 |
| 2,618,151 | Leas | Nov. 18, 1952 |